United States Patent
Noviello

(10) Patent No.: US 12,020,325 B2
(45) Date of Patent: *Jun. 25, 2024

(54) SYSTEM AND METHOD FOR PROVIDING AN OPERATOR INTERFACE FOR DISPLAYING MARKET DATA, TRADER OPTIONS, AND TRADER INPUT

(71) Applicant: BGC PARTNERS, INC., New York, NY (US)

(72) Inventor: Joseph C. Noviello, Summit, NJ (US)

(73) Assignee: BGC PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,434

(22) Filed: Mar. 31, 2023

(65) Prior Publication Data

US 2023/0274354 A1 Aug. 31, 2023

Related U.S. Application Data

(63) Continuation of application No. 16/886,841, filed on May 29, 2020, now Pat. No. 11,620,705, which is a continuation of application No. 11/686,695, filed on Mar. 15, 2007, now abandoned.

(51) Int. Cl.
G06Q 40/04 (2012.01)
G06F 3/04847 (2022.01)

(52) U.S. Cl.
CPC ......... G06Q 40/04 (2013.01); G06F 3/04847 (2013.01)

(58) Field of Classification Search
CPC .................. G06Q 40/04; G06F 3/04847

USPC .......................................... 705/37
See application file for complete search history.

(56) References Cited

U.S. PATENT DOCUMENTS

| | | | | |
|---|---|---|---|---|
| 5,644,113 A * | 7/1997 | Date | ................. | A63F 13/22 200/6 A |
| 5,984,785 A * | 11/1999 | Takeda | ................. | G06F 3/0383 345/161 |
| 7,587,357 B1* | 9/2009 | Buck | ................. | G06Q 40/04 705/37 |
| 2002/0163597 A1* | 11/2002 | Kelleher | ................. | H04N 7/0125 348/451 |

(Continued)

OTHER PUBLICATIONS

Graphical Interface for Market Asset Pricing Estimation with LSTM. Prasad, Pragada, Pallavi, Triveni, Praneeth. GMR Institute of Technology, Rajam. Journal of Pharmaceutical Negative Results, vol. 13, Special Issue 5. (Year: 2022) (Year: 2022).*

(Continued)

*Primary Examiner* — Eric T Wong
*Assistant Examiner* — John O Preston

(57) ABSTRACT

A system for providing an operator interface for displaying market data, trader options, and trader input includes a memory and a processor. The memory stores market data for a trading product, where the market data includes an inside market price for the trading product. The processor initiates display of a market data section of a tile, where the market data section comprises the market data. The processor initiates display of a trader input section of the tile, where the trader input section comprises options. The processor receives a selection of a bid-offer pair for the trading product from the options and updates the trader input section to indicate the selected bid-offer pair.

17 Claims, 3 Drawing Sheets

(56) References Cited

U.S. PATENT DOCUMENTS

| | | | | |
|---|---|---|---|---|
| 2004/0068458 A1* | 4/2004 | Russo | ............... | H04L 67/51 |
| | | | | 705/36 R |
| 2005/0144113 A1* | 6/2005 | Opperman | ............ | G06Q 40/06 |
| | | | | 705/37 |
| 2006/0287027 A1* | 12/2006 | Hardisty | ............... | A63F 13/45 |
| | | | | 463/8 |
| 2007/0005481 A1* | 1/2007 | Kedia | ............... | G06Q 40/04 |
| | | | | 705/37 |
| 2008/0288391 A1* | 11/2008 | Downs | ............... | G06Q 40/04 |
| | | | | 705/37 |
| 2011/0238555 A1* | 9/2011 | Rosenthal | ............ | G06Q 40/04 |
| | | | | 705/37 |

OTHER PUBLICATIONS

Evaluation of the Tobii EyeX Eye tracking controller and Matlab toolkit for research. Gibaldi, Vanegas, Bex, and Maiello. Springerlink.com. Jul. 11, 2016. (Year: 2016) (Year: 2016).*

ASETS—An Academic Trading Simulation Platform. Vinte, Lixandru, Jurubita, Bardan. Informatica Economica, vol. 14, No. 2/2010 (Year: 2010) (Year: 2010).*

* cited by examiner

SYSTEM AND METHOD FOR PROVIDING AN OPERATOR INTERFACE FOR DISPLAYING MARKET DATA, TRADER OPTIONS, AND TRADER INPUT

CROSS REFERENCE TO RELATED APPLICATION

This application is a continuation of U.S. patent application Ser. No. 11/686,695 filed Mar. 15, 2007, the disclosure of which is hereby incorporated by reference herein in its entirety.

TECHNICAL FIELD

This invention relates generally to the field of operator interface processing and more specifically to a system and method for providing an operator interface for displaying market data, trader options, and trader input.

BACKGROUND

In recent years, electronic trading systems have gained widespread acceptance for trading a wide variety of items, such as goods, services, financial instruments, and commodities. For example, electronic trading systems may be used to trade stocks, fixed income securities, currencies, futures contracts, oil, and gold.

Electronic trading systems may have a number of client systems connected to a trading platform. A client system may include input devices, such as keyboards or mouse devices, that may be used to communicate with the trading system. In some instances, keyboards may be specifically designed for use with a trading system.

SUMMARY OF THE DISCLOSURE

In accordance with the present invention, disadvantages and problems associated with previous techniques for displaying market data, trader options, and trader input may be reduced or eliminated.

According to one embodiment of the present invention, a system for displaying market data, trader options, and trader input includes a memory and a processor. The memory stores market data for a trading product, where the market data includes an inside market price for the trading product. The processor initiates display of a market data section of a tile, where the market data section comprises the market data. The processor initiates display of a trader input section of the tile, where the trader input section comprises options. The processor receives a selection of a bid-offer pair for the trading product from the options, and updates the trader input section to indicate the selected bid-offer pair.

Certain embodiments of the invention may provide one or more technical advantages. A technical advantage of one embodiment may be that a display has tiles that display information about trading products to a trader. A tile displays market data for a particular trading product. The market data may include a bid quantity, an inside market price, and an offer quantity. The tile also displays options from which the trader may select to designate desired conditions for initiating a trade for the trading product. The options may include quantities of and bid-offer pairs for the trading product. The trader may use knobs of a game controller device to make selections. One knob may be used to select a quantity, and another knob may be used to select a bid-offer pair. Thus, the trader may use the tile and the game controller device to easily select a quantity and a bid-offer pair for the trading product.

Another technical advantage of one embodiment may be that buttons of the game controller device may be used to initiate specific types of trades. One button may be used to initiate a bid and/or buy at the quantity and bid-offer pair selected by the trader. Another button may be used to initiate an offer and/or sell at the quantity and bid-offer pair selected by the trader. Yet another button may be used to initiate a buy at the inside market price. And, yet another button may be used to initiate a sell at the inside market price. Thus, a trader can readily initiate different types. of trades using the buttons of the game controller device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
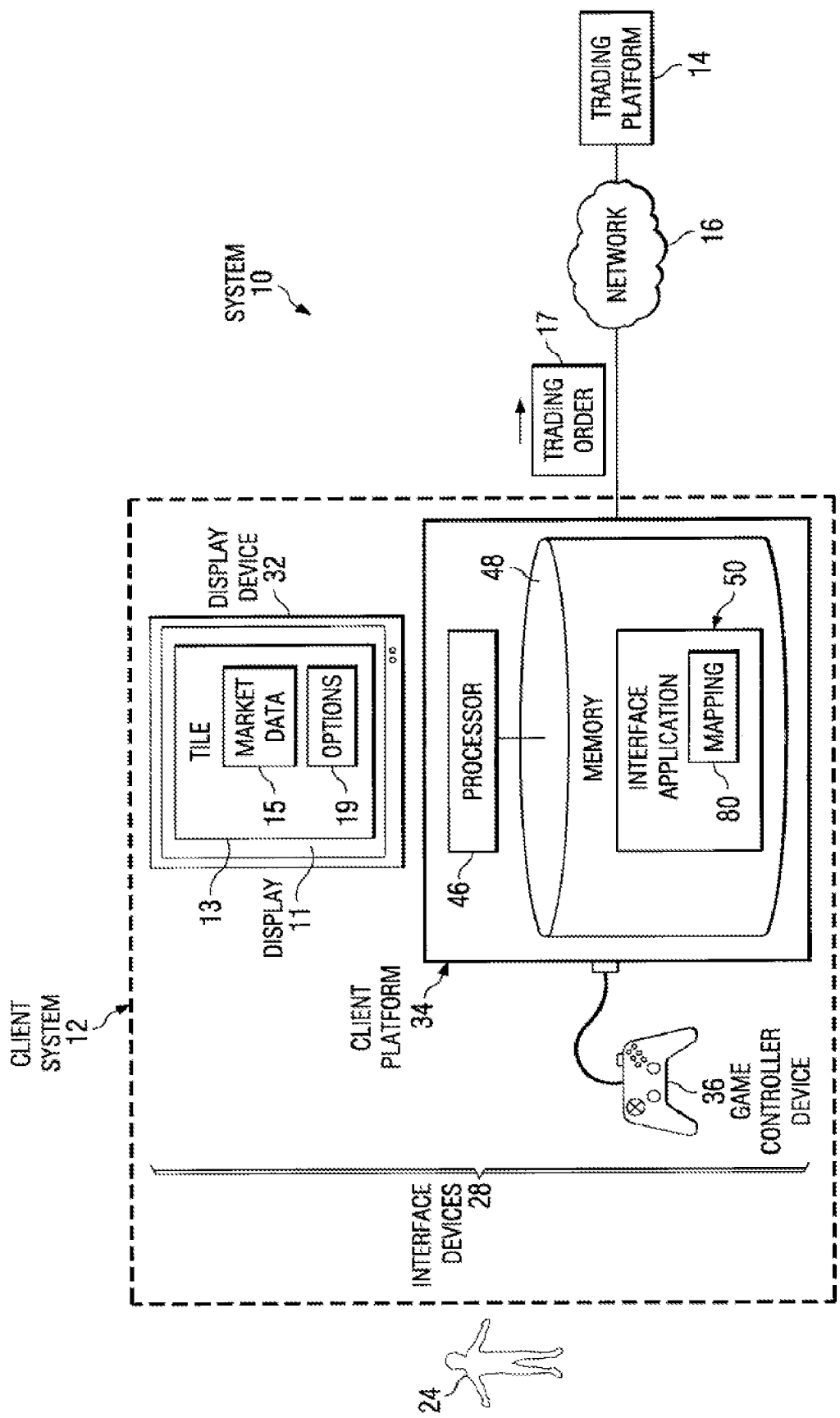
FIG. 1 illustrates one embodiment of an electronic trading system.

FIG. 1 illustrates one embodiment of an electronic trading system 10 operable to facilitate trading for traders 24. System 10 includes a client system 12, a trading platform 14, and a network 16, coupled as shown. Client system 12 includes interface devices 28 (such as a game controller device 36 and a display device 32) and a client platform 34. Client platform 34 includes a processor 46 and a memory 48.

In one example, client system 12 generates a display 11 that has tiles 13 that display information describing trading products. A tile 13 displays market data 15 for a trading product. Market data 15 is received in near real-time from a market data center and provides near real-time information for tile 13. Market data 15 may include a bid quantity, an inside market price, and an offer quantity.

Tile 13 also displays options 19 from which trader may select to designate desired conditions for initiating a trade. The options may include quantities and bid-offer pairs for the trading product. Trader 24 uses knobs of game controller device 36 to make selections. One knob may be used to select a quantity, and another knob may be used to select a bid-offer pair.

Trader 24 may monitor market data 15 and may decide to initiate a trade in response to market data 15. Trader 24 uses buttons of game controller device 36 to initiate specific types of trades. One button may be used to initiate a bid and/or buy at the quantity and bid-offer pair selected by trader 24.

Another button may be used to initiate an offer and/or sell at the quantity and bid-offer pair selected by trader 24. Yet another button may be used to initiate a buy at the inside market price. And, yet another button may be used to initiate a sell at the inside market price. Although this description is explained with respect to knobs and buttons of game controller device 36 to perform particular actions, these actions may be performed using any suitable number and combination of knobs, buttons, or other portions of device 36.

Accordingly, trader 24 may readily read the bid quantity, the inside market price, and the offer quantity for a trading product from tile 13. In addition, trader 24 may use tile 13 and game controller device 36 to easily select a quantity and a bid-offer pair for the trading product. Furthermore, trader 24 may use specific knobs and/or buttons of game controller device 36 to initiate specific types of trades.

According to one embodiment, traders 24 may represent users of trading system 10 capable of placing and/or responding to trading orders 17. A trader 24 may represent a principal, an agent acting on behalf of a principal, an individual, a legal entity (such as a corporation), or any machine or mechanism that is capable of placing and/or responding to trading orders 17.

A trading order 17 may represent an order to buy or sell a particular amount of a particular trading product. A trading product may refer to any suitable product or combination of products that forms the basis of a given trading order 17. Examples of trading products may include any type of goods, services, financial instruments, commodities, equities, stocks, fixed income securities, interest rate derivatives, currencies, futures contracts, debentures, options, securities, derivative trading instruments, or any other suitable product or combination of products.

A client system 12 may represent any suitable end-user element that may be used to access one or more elements of trading system 10, such as trading platform 14. Examples of an end-user element include a computer, a workstation, a telephone, an Internet browser, an electronic notebook, a personal digital assistant (PDA), a pager, or any other suitable device (wireless or otherwise) capable of receiving, processing, storing, and/or communicating information with other components of system 10.

Client system 12 may include interface devices 28 and a client platform 34. An interface device 28 may represent any suitable device operable to communicate signals to and/or from client platform 34 via a wired and/or a wireless link. Examples of interface devices 28 may include input devices, output devices, and/or input/output devices.

Examples of input devices include a game controller device 36, a keyboard, a mouse, a microphone, and/or another end-user element. Game controller device 36 represents any suitable input device that communicates with client platform 34. Examples of game controller devices 36 include video game controllers such as a joystick or a gamepad. An example of an output device includes a display device 32 that displays output information in a display 11. Examples of display device 32 include a computer display, a CRT monitor, or a television.

Client platform 34 includes a processor 46 and a memory 48 coupled as shown. Processor 46 comprises any suitable combination of hardware and/or software to perform the functions described herein, including processing data associated with trading system 10, which may involve executing coded instructions associated with interface application 50.

Memory 48 comprises any suitable combination of volatile and/or non-volatile memory that stores and/or facilitates retrieval of information. Memory 48 may store interface application 50. Interface application 50 comprises an application that allows interface devices 28 to receive and/or transmit information. For example, interface application 50 may include a graphical user interface (GUI) application that generates display 11 on display device 32. In the example, interface application may change display 11 in response to commands from interface devices 28 and/or trading platform 14. In the example, interface application 50 may also send messages to interface devices 28 and/or trading platform 14 in response to commands from interface devices 28 and/or trading platform 14.

In the illustrated embodiment, interface application 50 includes a mapping module 80. Mapping module 80 maps signals received from interface devices 28 and/or trading platform 14 with commands of trading system 10. In one example, a signal may be sent by trader 24 moving a joystick, pressing a button, and/or performing any other manipulation of an interface device 28. In the example, a command may comprise a system command and/or a trading command. A system command may be used to alter display 11, for example, to move a cursor. A trading command may be communicated to or from trading platform 14 to, for example, initiate and/or process a trade.

Signal relationships may be used to associate with a command. As an example, a manipulation (such as moving a joystick) may be associated with one command (such as moving a cursor). As another example, multiple manipulations (such as moving a joystick and pressing a button) may be associated with one command (such as sending a trading order request). As another example, a manipulation (such as pressing a button) may be associated with multiple commands (such as sending a trading order request and updating a display).

Trading platform 14 may represent a trading architecture that facilitates the processing of trading orders 17. Trading platform 14 may be configured at a management center or a headquartering office for any person, business, or entity that seeks to manage the trading of orders. Trading platform 14 may include any suitable combination of logic, personnel, devices, or entities that be utilized to perform the operations of an administrative body or a supervising entity that manages or administers a trading environment.

A network 16 may represent a communication platform operable to exchange information. A communication network may comprise at least a portion of a plain old telephone system (POTS), a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Modifications, additions, or omissions may be made to trading system 10 without departing from the scope of the invention. The components of trading system 10 may be integrated or separated according to particular needs. Moreover, the operations of trading system 10 may be performed by more, fewer, or other modules.

Figure 2:
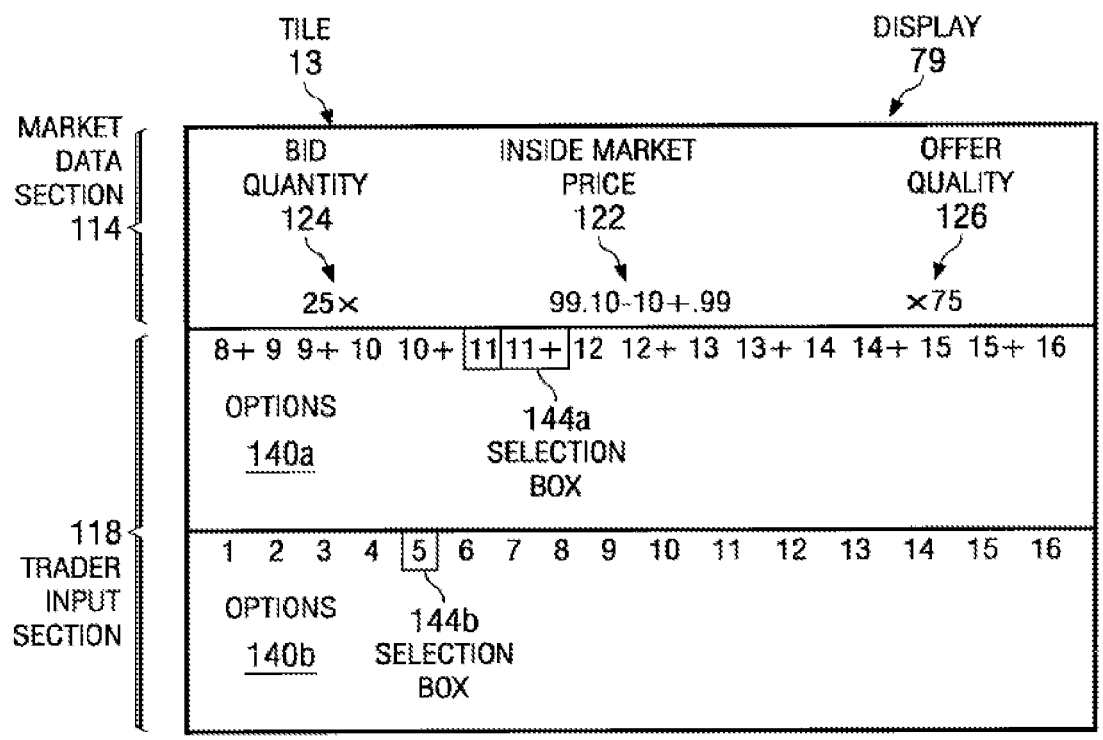
FIG. 2 illustrates an example of a display that includes a tile for use in the system of FIG. 1.

FIG. 2 illustrates an example of a display 11 that includes one or more tiles 13. According to one embodiment, a tile 13 may include a market data section 114 and a trader input section 118. Market data section 114 may display real-time market data 15. Market data 15 may be received in real-time or near real-time and may include current and/or historical market information such as trade volumes, trading conditions, trading volumes, numbers of outstanding trading orders 17, bid/offer prices, market prices, yield spreads, trends, and so forth.

According to the illustrated embodiment, market data section 114 includes an inside market price 122, a bid quantity 124, and an offer quantity 126 for a trading product. Bid quantity 124 is the quantity of the best bid for the trading product. Offer quantity 126 is the quantity of the best offer for the trading product. The inside market price represents the bid price of the best bid and the offer price of the best offer.

Trader input section 118 displays trader input that is input by a user such as trader 24. Examples of trader input include a quantity of the trading product and an input bid-offer pair for the trading product. A trader bid-offer pair comprises a bid price and an offer price designated by a trader 24.

According to the illustrated embodiment, trader input section 118 includes options 140 and selection boxes 144. Options 140 include numbers that may be selected by trader 24, and selection boxes 144 are used to indicate the selected numbers. According to the illustrated embodiment, trader input section 118 includes bid-offer pair options 140*a* and quantity options 140*b*. A bid-offer pair selection box 144*a* may indicate a bid-offer pair selected by trader 24, and a quantity selection box 144*b* may indicate a quantity selected by trader 24.

According to one embodiment, trader 24 may use game controller device 36 to move selection box 144 to options 140 that trader 24 would like to select. Trader 24 may move selection box 144 to the right or left of options 140 until an appropriate number is selected. A first selection box 144*a* may be moved to select a bid-offer pair, while a second selection box 144*b* may be moved to select a quantity. Although options 140*a* and 140*b* are illustrated in a horizontal arrangement, any suitable orientation of options 140*a* and 140*b* may be used.

Accordingly, trader 24 may readily read the bid quantity, the inside market price, and the offer quantity for a trading product from tile 13. In addition, trader 24 may use tile 13 and game controller device 36 to easily select a quantity and a bid-offer pair for the trading product.

Modifications, additions, or omissions may be made to display 11 without departing from the scope of the invention. Display 11 may include more, less, or other data. Additionally, the data may be arranged in any suitable manner without departing from the scope of the invention.

Figure 3:
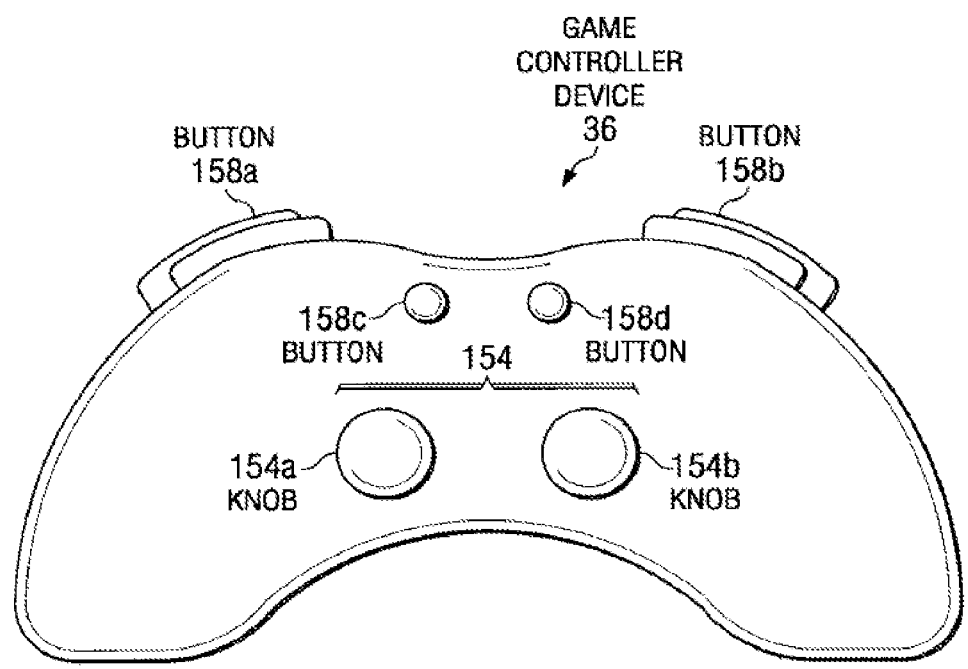
FIG. 3 illustrates an example of a game controller device for use in the system of FIG. 1.

FIG. 3 illustrates an example of game controller device 36. Game controller device 36 may include one or more knobs 154 and one or more buttons 158. In one embodiment, a trader 24 may manipulate knobs 154 and buttons 158 to initiate specific commands. Examples of manipulations may include depressing, lifting, translating, and/or rotating knobs 154 and/or buttons 158.

A knob 154 may be used to select an option 140 and may include any suitable device part, for example, a button, a joystick, or other type of part operable to move selection box 144 to an option 140. Any suitable number of knobs 154 may be used to select numbers. According to one embodiment, a particular knob 154 may be designated to select numbers from specific options 140. In the illustrated example, knob 154*a* may be used to select from options 140*a*, and knob 154*b* may be used to select from options 140*b*. According to another embodiment, one knob 154 may be used to select among multiple sets of options 140. As an example, a joystick may be used in a first direction, for example, in an up-down direction to select a particular set of options 140. The joystick may then be moved in a second direction, for example, a left-right direction, in order to select particular numbers of the particular options 140.

A button 158 may be used to send a request that initiates a trade. A trade may refer to a procedure for placing and/or responding to a trading order 17. Examples of trades include a bid, buy, offer, sell, buy at market price, or sell at market price procedure. A bid procedure places a bid for a trading product; a buy procedure places a buy order to buy a trading product; an offer procedure places an offer for a trading product; a sell procedure places a sell order to sell a trading product; a buy at market price procedure places a buy order to buy a trading product at the market price; and a sell at market price procedure places a sell order to sell a trading product at the market price.

Any suitable number of buttons 158 may be used to initiate any suitable trades. According to the illustrated embodiment, button 158*a* may be used to initiate a bid and/or buy procedure; button 158*b* may be used to initiate an offer and/or sell procedure; button 158*c* may be used to initiate a buy at market price procedure; and button 158*c* may be used to initiate a sell at market price procedure.

Accordingly, trader 24 may use knobs 154 of game controller device 36 to easily select a quantity and a bid-offer pair for a trading product. Furthermore, trader 24 may use specific buttons 158 of game controller device 36 to initiate different types of trades.

Modifications, additions, or omissions may be made to game controller device 36 without departing from the scope of the invention. The components of game controller device 36 may be integrated or separated according to particular needs. Moreover, the operations of game controller device 36 may be performed by more, fewer, or other knobs 154 and/or buttons 158.

Figure 4:
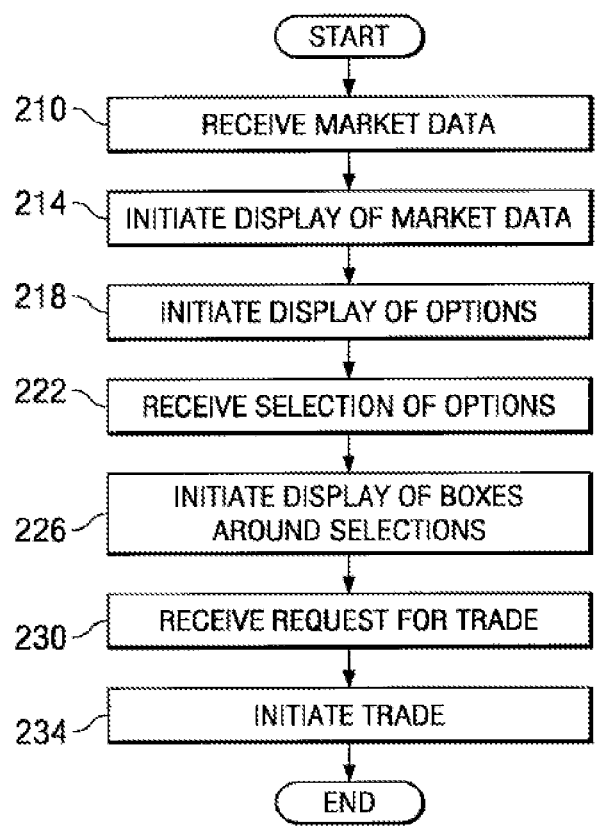
FIG. 4 illustrates one embodiment of a method for displaying one or more tiles.

FIG. 4 illustrates one embodiment of a method for displaying one or more tiles 13. The method begins at step 210, where interface application 50 receives market data 15 from trading platform 14. Market data 15 may include, for example, inside market price 122, bid quantity 124, and offer quantity 124 for a trading product. Interface application 50 initiates display of market data 15 in market data section 114 of tile 13 at step 214.

Interface application 50 initiates display of options 140 in trader input section 118 at step 218. Options 140 may include bid-offer pair options 140*a* and quantity options 140*b*. Interface application 50 receives trader 24's selection of options 140 at step 222. Trader 24 may use knobs 154 of game controller device 36 to make the selections. For example, trader 24 may select bid-offer pair 11/11+ and quantity 5.

Updating of trader input section 118 is initiated at step 226 to display the selections. Trader input section 118 may be updated by maneuvering selection boxes 144 around the selected options 140. For example, selection box 144*a* may be placed at 11/11+ and selection box 144*b* may be placed at 5.

A request for a trade is received at step 230. Trader 24 may use buttons 158 of game controller device 36 to make the request. The trade is initiated at step 234. The trade may be initiated by forwarding the request to trading platform 14. After initiating the trade, the method terminates.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

The invention claimed is:

1. An apparatus comprising:
an input device having a plurality of discrete input actuators for receiving user input, the plurality of discrete input actuators including a first input actuator and a second input actuator; and
a computing device to, based on input data from the plurality of discrete input actuators, send and receive signals to a second apparatus, the second apparatus comprising a display screen, the second apparatus being configured to render a graphical user interface and a graphical selection box on the display screen, the graphical user interface comprising a first input section and a second input section that borders the first input section,
wherein the first input section comprises a first graphical box where first data is displayed to span across the first graphical box in a horizontal manner, and wherein a first graphical selection box of the first input section is capable of being moved across in a horizontal manner to highlight at least a portion of the first data,
wherein the second input section comprises a second graphical box where second data is displayed to span across the second graphical box in a horizontal manner, and wherein a second graphical selection box of the second input section is capable of being moved across in a horizontal manner to highlight at least a portion of the second data simultaneously with movement of the first graphical selection box within the first input section, and
wherein movement of the graphical selection box of the first input section is independent of movement of the graphical selection box of the second input section;
wherein the first input actuator, upon actuation, generates actuation signals representing an up-down and left-right directions in response to movement in an up-down and left-right direction, which upon detection of movement in a given up-down or left-right direction, instructs the second apparatus to move the first graphical selection box in the given direction in the first input section to select a first entry among the first data; and
wherein the second input actuator, upon actuation, instructs the second apparatus to select a data portion highlighted by the graphical selection box in the first input section.

2. The apparatus of claim 1, wherein the plurality of discrete input actuators includes a third input actuator, a fourth input actuator, a fifth input actuator and sixth input actuator;
wherein the third input actuator, upon actuation, instructs the second apparatus to select a second data portion highlighted by the graphical selection box in the second input section;
wherein the fourth input actuator, upon actuation, instructs the second apparatus to initiate a first procedure based at least in part on a selected data portion and the selected second data portion; and
wherein the fifth input actuator, upon actuation, instructs the second apparatus to initiate a second procedure based at least in part on the selected data portion and the selected second data portion,
wherein the sixth input actuator is actuatable to instruct the second apparatus to move the second graphical selection box in the given direction in the second input section to select a second entry among the second data,
wherein the first and sixth input actuators are simultaneously actuatable to respectively control simultaneous movement of the first and second graphical selection boxes within the first and second graphical boxes.

3. The apparatus of claim 2, wherein the sixth input actuator, upon actuation, instructs the second apparatus to initiate a third procedure.

4. The apparatus of claim 1, wherein the computing device is configured to communicate with the second apparatus and configured to map a combination of the input actuators to a particular command.

5. The apparatus of claim 1, wherein market data is received in near real time from a market data center and the market data is to populate in near real time a market data section of the graphical user interface that borders the first input section.

6. The apparatus of claim 1, wherein the computing device is further configured to communicate with the second apparatus which comprises a trading platform that comprises a trading architecture to facilitate processing of trading orders.

7. The apparatus of claim 1, wherein the first input actuator is coupled to a first control knob, and the second input actuator is coupled to a second control knob, and
wherein the first and second control knobs are simultaneously movable to respectively control the simultaneous movement of the first and second graphical selection boxes within the first and second graphical boxes.

8. A method comprising;
receiving user input data from a plurality of discrete input actuators of an input device, the plurality of discrete input actuators including a first input actuator and a second input actuator; and
communicating, by a computing device and based on the user input data from the plurality of discrete input actuators, signals with an apparatus, the apparatus comprising a display screen, the apparatus being configured to render a graphical user interface and a graphical selection box on the display screen, the graphical user interface comprising a first input section and a second input section that borders the first input section,
wherein the first input section comprises a first graphical box where first data is displayed to span across the first graphical box in a horizontal manner, and wherein a first graphical selection box of the first input section is capable of being moved across in a horizontal manner to highlight at least a portion of the first data,
wherein the second input section comprises a second graphical box where second data is displayed to span across the second graphical box in a horizontal manner, and wherein a second graphical selection box of the second input section is capable of being moved across in a horizontal manner to highlight at least a portion of the second data simultaneously with movement of the first graphical selection box within the first input section,
wherein movement of the graphical selection box of the first input section is independent of movement of the graphical selection box of the second input section; and wherein said communicating signals with the apparatus comprises:

based on actuation of the first input actuator, generating actuation signals representing an up-down and left-right directions in response to movement in an up-down and left-right direction, which upon detection of movement in a given up-down or left-right direction, instructs the apparatus to move the first graphical selection box in the given direction in the first input section to select a first entry among the first data, and based on actuation of the second input actuator, instructing the apparatus to select a data portion highlighted by the graphical selection box in the first input section.

9. The method of claim 8, wherein the plurality of discrete input actuators includes a third input actuator, a fourth input actuator, a fifth input actuator and sixth input actuator, and wherein said communicating signals with the apparatus comprises:

based on actuation of the third input actuator, instructing the apparatus to select a second data portion highlighted by the graphical selection box in the second input section, based on actuation of the fourth input actuator, instructing the apparatus to initiate a first procedure based at least in part on a selected data portion and the selected second data portion, based on actuation of the fifth input actuator, instructing the apparatus to initiate a second procedure based at least in part on the selected data portion and the selected second data portion, and based on actuation of the sixth input actuator, generating actuation signals instructing the apparatus to move the second graphical selection box in the given direction in the second input section to select a second entry among the second data, wherein the first and sixth input actuators are simultaneously actuatable to respectively control simultaneous movement of the first and second graphical selection boxes within the first and second graphical boxes.

10. The method of claim 8, further comprising mapping a combination of the input actuators to a particular command.

11. The method of claim 8, wherein market data is received in near real time from a market data center and the market data is to populate in near real time a market data section of the graphical user interface that borders the first input section.

12. The method of claim 8, wherein the apparatus comprises a trading platform that comprises a trading architecture to facilitate processing of trading orders.

13. A non-transitory computer-readable medium having stored thereon instructions that are configured to, when executed by at least one computing device, direct the at least one computing device to:

receive user input data from a plurality of discrete input actuators of an input device, the plurality of discrete input actuators including a first input and a second input actuator;

communicate signals to an apparatus based on the user input data, the apparatus comprising a display screen, the apparatus being configured to render a graphical user interface and a graphical selection box on the display screen, the graphical user interface comprising a first input section and a second input section that borders the second input section, wherein the first input section comprises a first graphical box where first data is displayed to span across the first graphical box in a horizontal manner, and wherein a first graphical selection box of the first input section is capable of being moved across in a horizontal manner to highlight at least a portion of the first data simultaneously with movement of the first graphical selection box within the first input section, wherein the second input section comprises a second graphical box where second data is displayed to span across the second graphical box in a horizontal manner, and wherein a second graphical selection box of the second input section is capable of being moved across in a horizontal manner to highlight at least a portion of the second data, and wherein movement of the graphical selection box of the first input section is independent of movement of the graphical selection box of the second input section;

instruct the apparatus to move the first graphical selection box in a given direction in the first input section based on user input data from the first input actuator that includes up-down or left-right commands corresponding to up-down or left-right movement of the first input actuator, to select a first entry among the first data; and instruct the apparatus to select a data portion highlighted by the graphical selection box in the first input section based on user input data from the second input actuator.

14. The non-transitory computer-readable medium of claim 13, wherein the plurality of discrete input actuators includes a third input actuator, a fourth input actuator, a fifth input actuator and sixth input actuator, and wherein that instructions are configured to, when executed by the at least one computing device, direct the at least one computing device to:

instruct the apparatus to select a second data portion highlighted by the graphical selection box in the second input section based on user input data from the third input actuator;

instruct the apparatus to initiate a second procedure based at least in part on a selected data portion and the selected second data portion based on user input data from the fourth input actuator;

instruct the apparatus to initiate a second procedure based at least in part on the selected data portion and the selected second data portion based on user input data from the fifth input actuator; and instruct the apparatus to move the second graphical selection box in the given direction in the second input section based on user input data from the sixth input actuator, to select a second entry among the second data, wherein the first and second input actuators are simultaneously actuatable to respectively control simultaneous movement of the first and second graphical selection boxes within the first and second graphical boxes.

15. The non-transitory computer-readable medium of claim 13, wherein the medium having stored thereon instructions that are configured to, when executed by the at least one computing device, direct the at least one computing device to allow the apparatus to be further configured to map a combination of the input actuators to a particular command.

16. The non-transitory computer-readable medium of claim 13, wherein the medium having stored thereon instructions that are configured to, when executed by the at least one computing device, direct the at least one computing device to receive market data in near real time from a market data center, in which he market data is to populate in near real time a market data section of the graphical user interface that borders the first input section.

17. The non-transitory computer-readable medium of claim 13, wherein the medium having stored thereon instructions that are configured to, when executed by at least one computing device, direct the at least one computing device to communicate with the apparatus configured as a trading platform that comprises a trading architecture to facilitate processing of trading orders.

* * * * *